US012730215B2

(12) United States Patent
Bui-Van et al.

(10) Patent No.: US 12,730,215 B2

(45) Date of Patent: Sep. 8, 2026

(54) VEHICULAR RADAR SYSTEM WITH MULTI-MODE SENSOR HAVING 3D ANTENNA ARRAY

(71) Applicant: Magna Electronics Inc., Auburn Hills, MI (US)

(72) Inventors: Ha Bui-Van, Aschaffenburg (DE); Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 221 days.

(21) Appl. No.: 18/776,644

(22) Filed: Jul. 18, 2024

(65) Prior Publication Data

US 2025/0028042 A1 Jan. 23, 2025

Related U.S. Application Data

(60) Provisional application No. 63/514,625, filed on Jul. 20, 2023.

(51) Int. Cl.
*G01S 13/87* (2006.01)
*H01Q 1/32* (2006.01)

(52) U.S. Cl.
CPC .......... *G01S 13/874* (2013.01); *G01S 13/878* (2013.01); *H01Q 1/3233* (2013.01); *H01Q 1/3283* (2013.01)

(58) Field of Classification Search
CPC ................. G01S 13/874; G01S 13/878; G01S 2013/93274; G01S 13/931; G01S 7/356; G01S 7/41; G01S 13/583; G01S 13/02; G01S 13/42; G01S 7/292; G01S 7/36; H01Q 1/3233; H01Q 1/3283
See application file for complete search history.

(56) References Cited

U.S. PATENT DOCUMENTS

| | | | |
|---|---|---|---|
| 7,375,803 | B1 | 5/2008 | Bamji |
| 7,405,812 | B1 | 7/2008 | Bamji |
| 7,954,866 | B2 | 6/2011 | Barcomb et al. |
| 8,013,780 | B2 | 9/2011 | Lynam |
| 8,027,029 | B2 | 9/2011 | Lu et al. |
| 9,036,026 | B2 | 5/2015 | Dellantoni et al. |
| 9,146,898 | B2 | 9/2015 | Ihlenburg et al. |
| 9,575,160 | B1 | 2/2017 | Davis et al. |
| 9,599,702 | B1 | 3/2017 | Bordes et al. |

(Continued)

*Primary Examiner* — Bernarr E Gregory
(74) *Attorney, Agent, or Firm* — HONIGMAN LLP

(57) ABSTRACT

A vehicular radar sensing system includes a radar sensor disposed at a vehicle. The radar sensor includes a plurality of facets, each having an inboard surface facing toward the vehicle and an outboard surface facing away from the vehicle. A respective transmitter and a respective receiver of each facet operate to have a respective field of sensing with a respective principal sensing axis that is perpendicular to the respective facet. The vehicular sensing system, via processing of captured sensor data, (i) determines presence of a first object within a first respective field of sensing and (ii) determines presence of a second object within a second respective field of sensing. The vehicular sensing system, responsive to determining presence of the first object and the second object, controls a system of the vehicle based on the determined presence of the first object and the second object.

26 Claims, 9 Drawing Sheets

Multi-Mode Radar

Side (1) - with medium-range, for corner

Side (2) - with short-range, side radar
↳Can be used for parking!

Side (3) → high-gain, Narrow beam antennas for Long-Range Front/Rear radar

(56) References Cited

U.S. PATENT DOCUMENTS 9,653,796 B2 5/2017 Pleva
9,689,967 B1 6/2017 Stark et al.
9,753,121 B1 9/2017 Davis et al.
9,828,036 B2 11/2017 Frayer et al.
9,869,762 B1 1/2018 Alland et al.
9,954,955 B2 4/2018 Davis et al.
9,963,085 B2 5/2018 Smith et al.
10,239,446 B2 3/2019 May et al.
10,534,081 B2 1/2020 Wodrich
10,768,298 B2 9/2020 Wodrich et al.
10,866,306 B2 12/2020 Maher et al.
12,044,794 B2 7/2024 Wodrich et al.
12,345,809 B2 7/2025 Bui-Van et al.
2006/0262009 A1* 11/2006 Watanabe ................. G01S 7/36 342/159
2010/0245066 A1 9/2010 Sarioglu et al.
2014/0111370 A1 4/2014 Aleem et al.
2016/0023598 A1 1/2016 Kohler et al.
2017/0047649 A1 2/2017 Himmelstoss
2017/0222311 A1 8/2017 Hess et al.
2017/0254873 A1 9/2017 Koravadi
2017/0276788 A1 9/2017 Wodrich
2017/0315231 A1 11/2017 Wodrich
2017/0356994 A1 12/2017 Wodrich et al.
2018/0015875 A1 1/2018 May et al.
2018/0045812 A1 2/2018 Hess
2018/0231635 A1 8/2018 Woehlte
2019/0195984 A1* 6/2019 Goda .................... G01S 13/931
2019/0339382 A1 11/2019 Hess et al.
2019/0353751 A1* 11/2019 Raphaeli ................. G01S 7/292
2020/0003888 A1* 1/2020 Fujitsu .................. G01S 13/931
2020/0238904 A1* 7/2020 Kim ...................... G01S 13/931
2020/0249343 A1 8/2020 Yu et al.
2020/0292663 A1* 9/2020 Bai ......................... G01S 13/42
2020/0341108 A1* 10/2020 Heller ..................... G01S 13/02
2021/0373152 A1 12/2021 Roh et al.
2022/0171050 A1* 6/2022 Liu ....................... G01S 13/583
2022/0187063 A1* 6/2022 Shimizu .................... G01S 7/41
2022/0201886 A1 6/2022 Fuke
2022/0206112 A1* 6/2022 Bialer ..................... G01S 7/356
2022/0206132 A1* 6/2022 Bialer ................... G01S 13/931
2022/0206134 A1* 6/2022 Shimizu ................ G01S 13/931
2023/0061836 A1* 3/2023 Hotta .................... G01S 13/931
2023/0073814 A1* 3/2023 Hotta .................... G01S 13/931
2023/0074625 A1* 3/2023 Hotta .................... G01S 13/931
2023/0273297 A1* 8/2023 Bai ....................... G01S 13/931 342/200
2023/0316735 A1* 10/2023 Lee ....................... G01S 13/931 382/104
2023/0415734 A1 12/2023 Zhu et al.
2024/0077582 A1 3/2024 Cerqueira Pinto et al.
2024/0361445 A1* 10/2024 Paker .................... G01S 13/931

* cited by examiner

4 - Corner Radar
2 - Side Radar
1 - Front Long-Range Radar
2 - Rear Long-Range Radar Multi-Mode Radar Side (1) - with medium-range, for corner Side (2) - with short-range, side radar
↳Can be used for parking!

Side (3) → high-gain, Narrow beam antennas for Long-Range Front/Rear radar

VEHICULAR RADAR SYSTEM WITH MULTI-MODE SENSOR HAVING 3D ANTENNA ARRAY

CROSS REFERENCE TO RELATED APPLICATION

The present application claims the filing benefits of U.S. provisional application Ser. No. 63/514,625, filed Jul. 20, 2023, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular radar sensing system includes a radar sensor disposed at a vehicle equipped with the vehicular radar sensing system that senses exterior of the vehicle. The radar sensor is operable to capture radar data. The radar sensor includes (i) a plurality of transmitters that transmit radio signals and (ii) a plurality of receivers that receive radio signals. An electronic control unit (ECU) includes electronic circuitry and associated software. Radar data captured by the radar sensor is transferred to the ECU. The electronic circuitry of the ECU includes a data processor. The ECU is operable to process radar data captured by the radar sensor and transferred to the ECU. The radar sensor includes a plurality of facets, and each facet of the plurality of facets has (i) an inboard surface facing toward the vehicle and (ii) an outboard surface facing away from the vehicle. The outboard surface of each facet of the plurality of facets is arranged at an obtuse angle relative to the outboard surface of an adjacent facet of the plurality of facets, and each facet of the plurality of facets has (i) a respective transmitter of the plurality of transmitters disposed thereat and (ii) a respective receiver of the plurality of receivers disposed thereat. The respective transmitter and the respective receiver of each facet of the plurality of facets operate to have a respective field of sensing, and each respective field of sensing has a respective principal sensing axis. Each respective principal sensing axis is perpendicular to the outboard surface of the respective facet. The respective field of sensing of the respective transmitter and the respective receiver of a first facet of the plurality of facets is different from the respective field of sensing of the respective transmitter and the respective receiver of a second facet of the plurality of facets adjacent to the first facet. The vehicular radar sensing system, via processing at the data processor of radar data captured by the radar sensor, simultaneously (i) determines presence of a first object within the respective field of sensing of the respective transmitter and the respective receiver of the first facet and (ii) determines presence of a second object within the respective field of sensing of the respective transmitter and the respective receiver of the second facet. The vehicular radar sensing system, responsive to determining presence of the first object and the second object, controls a system of the vehicle based on the determined presence of the first object and the second object.

These and other objects, advantages, purposes and features of the present invention will become apparent upon review of the following specification in conjunction with the drawings.

DESCRIPTION OF THE PREFERRED EMBODIMENTS

A vehicle sensing system and/or driver or driving assist system and/or object detection system and/or alert system operates to capture sensor data exterior of the vehicle and may process the captured sensor data to detect objects at or near the vehicle and in the predicted path of the vehicle, such as to assist a driver of the vehicle in maneuvering the vehicle in a rearward direction. The sensing system includes a processor or processing system that is operable to receive sensing data from one or more radar sensors.

Figure 1:
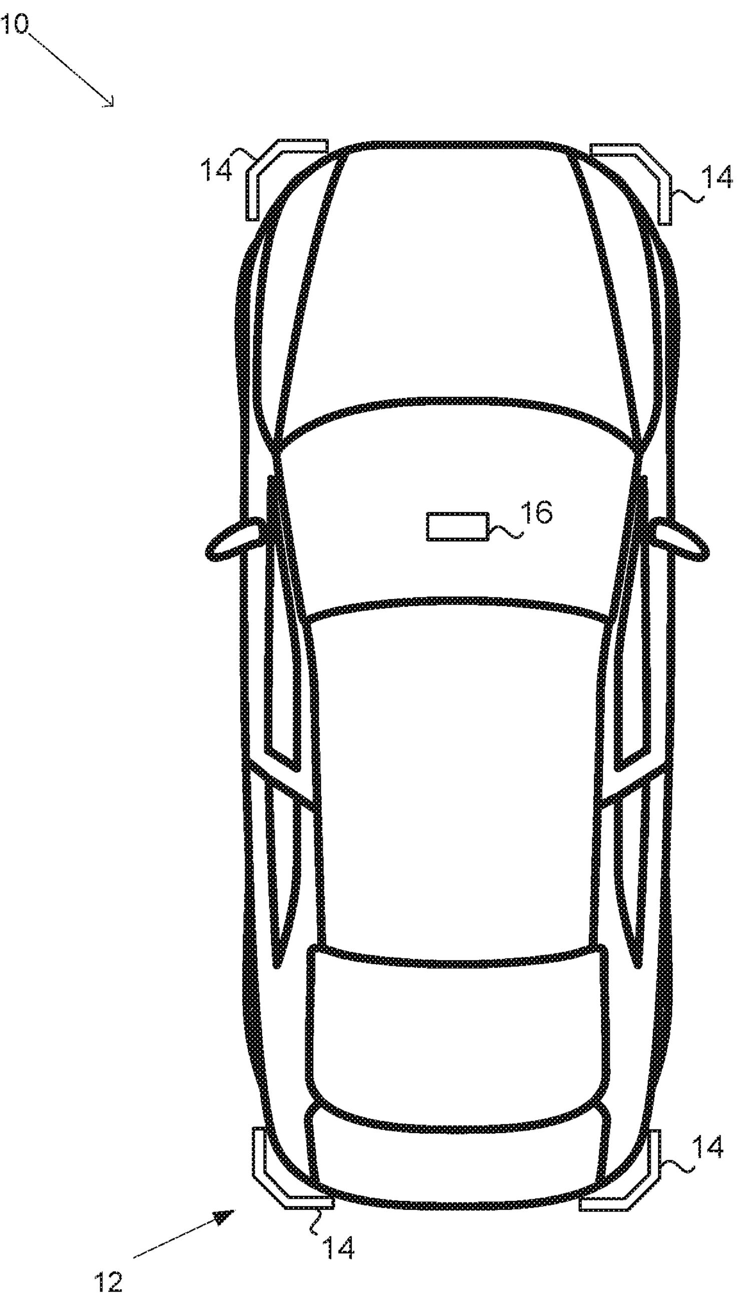
FIG. 1 is a plan view of a vehicle with a sensing system that incorporates radar sensors.

Referring now to the drawings and the illustrative embodiments depicted therein, a vehicle 10 (FIG. 1) includes an driving assistance system or sensing system 12 that includes at least one radar sensor unit (e.g., one, two, or four radar sensor units), such as a multifaceted radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) 16 that includes a data processor that is operable to process data captured by the radar sensor(s). The sensing system may also include a radar sensor that includes a plurality of transmitters that transmit radio signals via a plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controlling at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Figure 2:
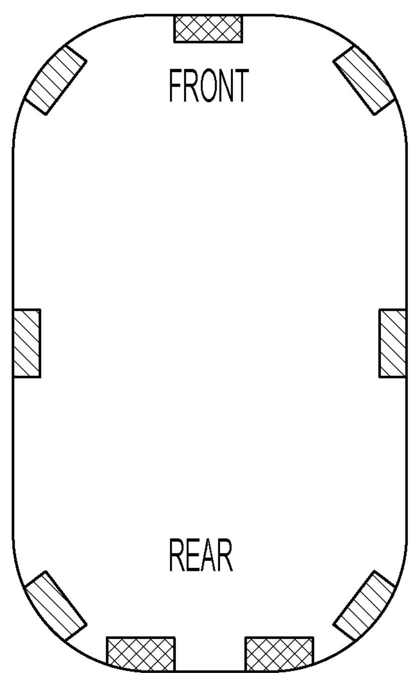
FIG. 2 is a schematic view of a vehicle equipped with corner radar sensors, side radar sensors, a front radar sensor, and rear radar sensors.

Many automobiles, in order to sense surrounding environments and to provide feedback for advanced functions (such as for one or more advanced driver assistance systems (ADAS)), are equipped with multiple radar sensors (FIG. 2). For example, when the performance requirements include autonomous driving, the vehicle may require multiple radar sensors to achieve 360 degree sensor coverage around the vehicles at different sensing distances. In this example, the vehicle includes four corner radar sensors for mid-range sensing, one front radar sensor for long-range sensing, two rear radar sensors for long-range sensing, and two side radar sensors for short-range sensing (e.g., for blind spot monitoring). Equipping all of these radar sensors allows the sensing system to cover different ranges and fields of view, but is expensive and difficult to integrate.

Figure 3:
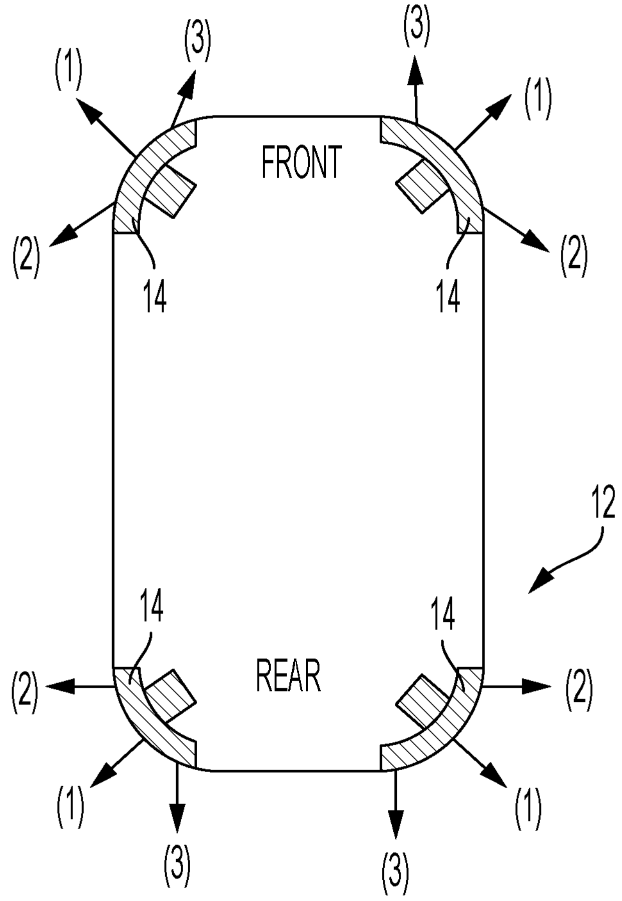
FIG. 3 is a schematic view of a vehicle equipped with multi-mode radar (MMR) sensors.

Referring now to FIG. 3, the sensing system 12 disclosed herein includes a multi-mode radar (MMR) that includes one or more three-dimensional (3D) antenna arrays or radar sensors 14. Each radar sensor 14 includes a plurality of sides or faces (e.g., three faces) and each face provides a different radiation characteristic and subsequently a different performance focus. In the example of FIG. 3, the vehicle is equipped with four radar sensors 14, with one radar sensor 14 disposed at each corner of the vehicle. Each radar sensor 14 has multiple faces or facets with each face having a different orientation relative to the vehicle. Each face may provide different performance characteristics, such as medium range sensing for corners, short range sensing for sides of the vehicle, and long range sensing for the front and rear of the vehicle (e.g., high-gain and narrow-beam radar sensors).

Figure 4:
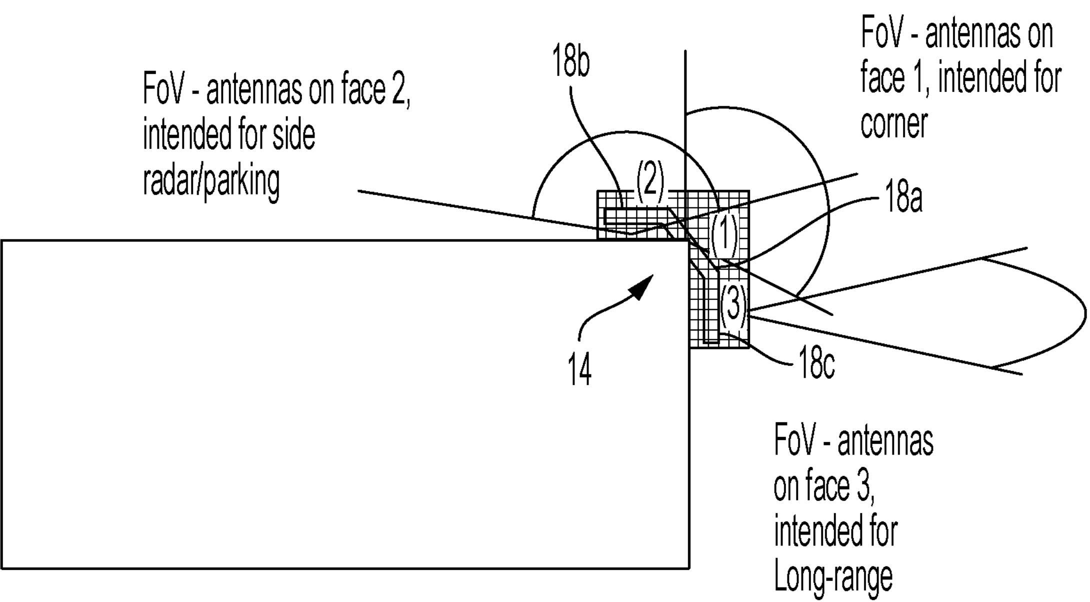
FIG. 4 is schematic views of a vehicle equipped with a radar sensor having a multifaceted radar module.

As shown in FIG. 4, each radar sensor 14 may include at least three faces or facets or surfaces, such as a first surface 18*a*, a second surface 18*b*, and a third surface 18*c*. The first surface 18*a* may provide medium-range corner radar coverage, the second surface 18*b* may provide short-range side radar coverage (e.g., for blind spot monitoring and/or parking), and the third surface 18*c* may provide long-range sensing forward of the vehicle. Each facet has an inboard side or surface that faces toward the vehicle and an outboard side or surface that faces away from the vehicle. A principle sensing axis of each surface (i.e., the transmitters/receivers of that surface) may be perpendicular to the outboard surface. The radar sensor 14 may be disposed or installed at the vehicle in such a way so that each surface 18*a-c* is oriented with a different side of the vehicle. For example, the first surface 18*a* may be oriented parallel to the corner of the vehicle, the second surface 18*b* may be oriented parallel to a side of the vehicle, and the third surface 18*c* may be oriented parallel to the front or rear of the vehicle. The first surface 18*a* joins the second surface 18*b* and the third surface 18*c* such that the three surfaces 18*a-c* form a single integrated radar sensor.

Figure 5:
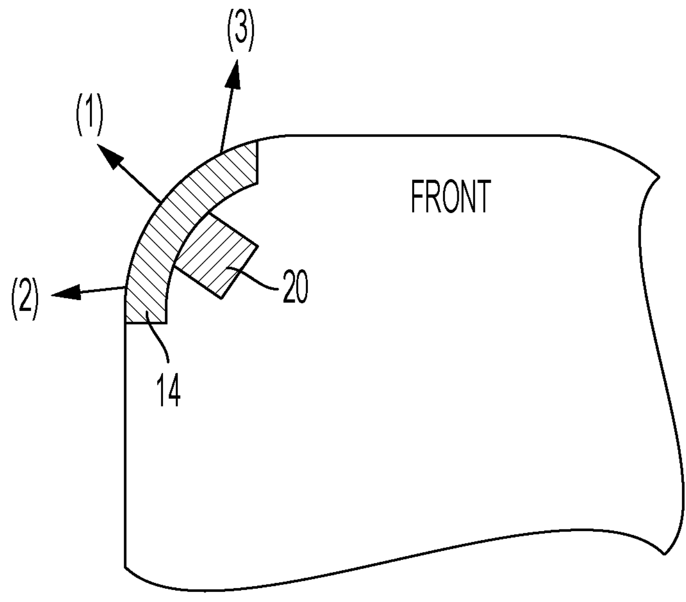
FIG. 5 is a schematic view of the multifaceted radar module of FIG. 4.

Referring now to FIG. 5, each face or side or surface of the 3D radar module or sensor 14 has independent radiation elements. These elements may have different radiation characteristics (e.g., different antenna gain, field of view, etc.). The elements on each face form an independent operation mode (i.e., depending on the radiation characteristics of the radiation elements). Each radar sensor 14 may be disposed at or near a printed circuit board (PCB) 20. The PCB 20 interfaces with the antenna. Each PCB includes one or more integrated circuits (ICs) that perform radar operation such as generating transmit signals, processing received signals, etc. In some examples, each face may be associated with a different respective PCB. In other examples, each face may be associated with the same PCB. Thus, the 3D radar sensors 14 provide a multi-mode radar where each mode is performed by a different face or surface of the radar sensor(s) 14. This allows the system to operate multiple different modes (i.e., a side mode, a corner mode, a front mode, and/or a rear mode) using the same hardware platform. The operating mode is determined by the 3D antenna array design using appropriate radiation characteristics for the operation mode (e.g., high-gain and narrow beam to provide long-range sensing in front of the vehicle or low-gain and wide beam to provide short-range sensing at the side of the vehicle). Each mode may be operated independently by the system and, in some examples, cooperate to improve performance. For example, the different modes may cooperate to provide a larger field of view (such as a combined field of view or sensing that is greater than 180 degrees) or reduce a size of a blind spot. Integration of these modes into 3D antenna arrays reduces integration time and cost.

In some examples, each radar sensor 14 includes three surfaces which allow the radar sensor to provide a combination of short-range, mid-range, and long-range sensing in a single hardware package. In other examples, each radar sensor 14 includes two faces to provide short-range/mid-range sensing and long-range sensing. Each surface includes a number of radiating elements on the surface of the face that provide radiation characteristics for that face that are different from the radiation characteristics of the other faces (e.g., high-gain narrow beam versus low-gain wide beam). The independent radiation elements allow the radar sensor 14 to operate a different mode of operation, using each face, simultaneously. Each face may be oriented in a different direction relative to the vehicle and/or the other faces.

Figure 6:
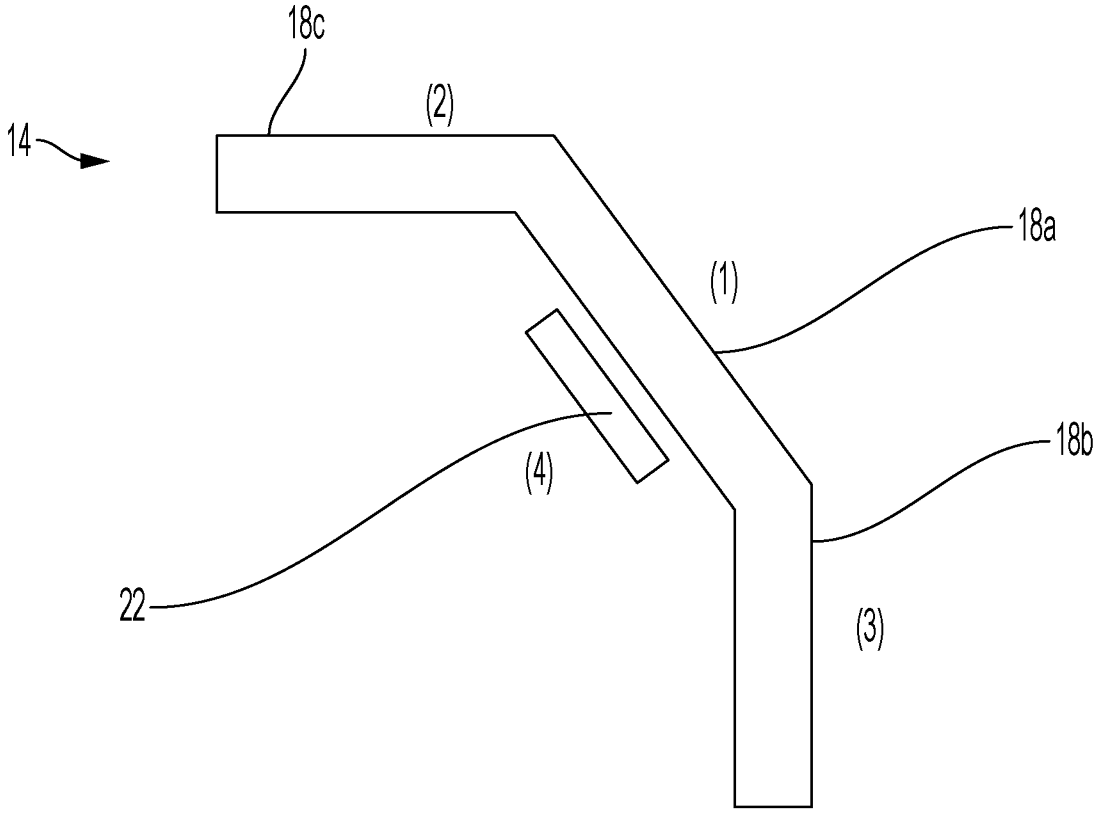
FIG. 6 is a top view of the multifaceted radar module.
Figure 7:
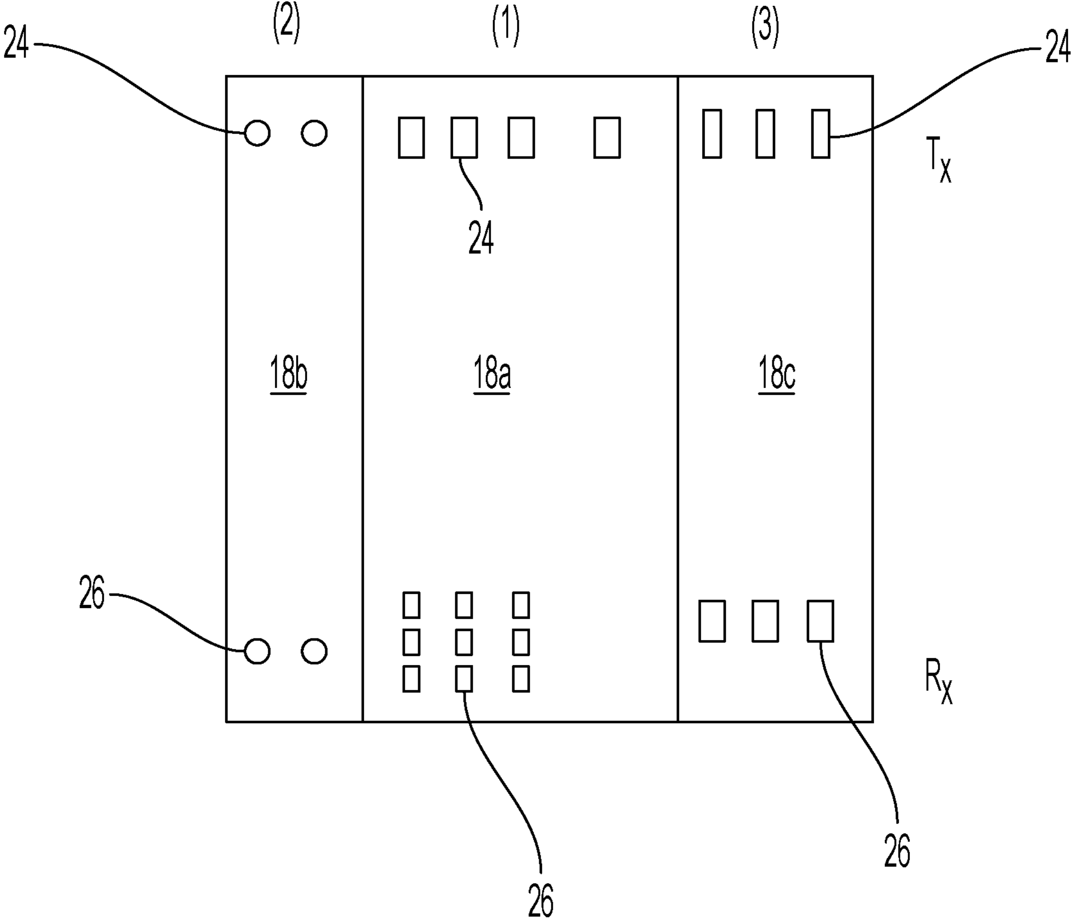
FIG. 7 is a front view of the multifaceted radar module.
Figure 8:
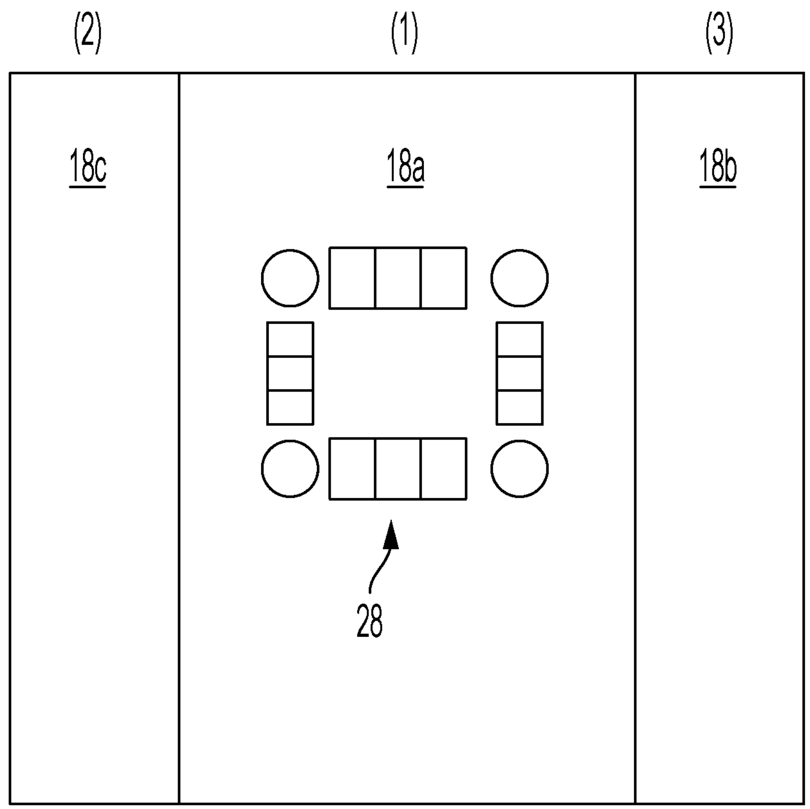
FIG. 8 is a rear view of the multifaceted radar module.

FIG. 6 includes an exemplary 3D antenna array or module or radar sensor 14. Here, the radar sensor 14 includes a first surface 18*a* directed away from a corner of the vehicle, a second surface 18*b* directed away from a front or a rear of the vehicle, and a third surface 18*c* directed away from a side of the vehicle. Each surface may be disposed at an angle from the other surfaces to provide different fields of view for the radiating elements disposed on the respective surfaces. For example, the first surface 18*a* may be disposed at an obtuse angle (e.g., 135 degrees) relative to the second and third surfaces 18*b-c* and the second and third surfaces 18*b-c* may be disposed approximately 90 degrees relative to each other. As another example, when the radar sensor includes only two surfaces, the surfaces may be disposed at approximately 135 degrees or at approximately 90 degrees or any angle in-between relative to each other. A waveguide port 22 may couple ports on the back of the module and/or may couple power from the PCB to the antennas via a coupling structure at the PCB. Referring now to FIG. 7, a front side of the first surface 18*a*, the second surface 18*b*, and the third surface 18*c* includes one or more transmitting radiating elements 24 (i.e., transmitters). The transmitting radiating elements 24 may be any shape (e.g., round, square, rectangular, etc.). The shape, size, quantity, and/or positioning of the transmitting radiating elements 24 may differ between surfaces (e.g., to affect antenna characteristics). Each surface also includes one or more receiving radiating elements 26 (i.e., receivers). The shape, size, quantity, and/or positioning of the receiving radiating elements 26 may differ between surfaces (e.g., to affect antenna characteristics). At FIG. 8, waveguide coupling ports 28 are disposed at a rear side of the radar sensor. Optionally, the waveguide coupling ports 28 are disposed at a rear surface of only a single surface (e.g., the center or first surface 18*a*). The shape and/or distribution of the waveguide ports 28 may be optimized to maximize power coupled to the radiating elements 24 disposed at the front surfaces.

Figure 9:
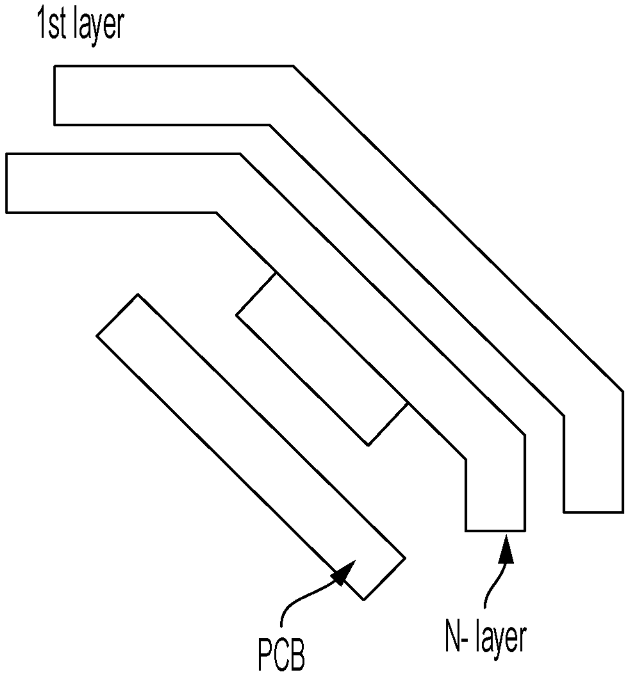
FIG. 9 is an exploded view of the multifaceted radar module.

Referring now to FIG. 9, the modules may be made by cascading several layers (e.g., 3D printed layers) where, for example, the first layer (i.e., outermost layer relative to the vehicle) includes the radiating elements on multiple external faces and the last layer (i.e., the innermost layer relative to the vehicle) hosts the waveguide coupling port (i.e., where the interface between the antenna module and the main PCB takes place). The intermediate layers may be a medium for connecting the waveguide coupling port at the last layer to the corresponding radiating element at the first layer. These layers may be attached together to form a 3D antenna module by means of glue/adhesives, mechanical contact, or by other similar means. The interface between the antenna modules and the main PCB may occur via the waveguide coupling ports, which may be concentrated at a single surface, thus making it possible to connect the antenna with a single flat/planar PCB only. The system may utilize aspects of the systems described in U.S. Publication No. US-2024-0118414, which is hereby incorporated herein by reference in its entirety.

Thus, the system includes a multi-mode radar that includes one or more (e.g., two or four or more) 3D antenna arrays or radar sensors and associated hardware that operates with different modes simultaneously (i.e., different modes in term of range, resolutions, field of view, frequency, etc.). Each 3D antenna array includes multiple radiating antenna elements distributed across the different surfaces/facets of the 3D structure. The radiating antenna elements send the transmitting radio signal to the external environment in different directions. These radiating elements may have different radiation characteristics, such as different antenna gain, different field of view, etc., depending on the surface the element is disposed upon. For example, on a first facet (such as a corner-facing facet), the radiating elements on the facet provide medium gain and a large field of view to serve mid-range functions. A second facet (such as a side-facing facet) includes elements that provide low gain and a very wide field of view to serve short-range functions as well as for parking assistance purposes. A third facet (such as a front-facing facet and/or rear facing facet) includes elements that have very high-gain and a narrow beam or narrow field of view to serve long-range functions (e.g., to detect objects at a great distance from the vehicle).

While the radiating elements are distributed on several surfaces (e.g., two faces, three faces, or more), the excitation for these elements are routed (i.e., via an interface with the main PCB hardware) to a primary surface at the back of the radar sensor. The location of the interface allows the 3D antenna array to be integrated with a single flat or planar PCB (i.e., where the main electronics are disposed). The interface between the 3D antenna arrays and the PCB may be via direct or indirect contact, such as through the use of the waveguide coupling ports or any other electromagnetic coupling structure. On the main PCB, there may be a single or multiple system on chip (SoC) that may perform radar operations, such as generating radio signals. The radio signals may be sent to the external environment via the 3D antenna arrays. The SoC may also process reflected signals returned to the radar sensor (i.e., transmitted signals that have reflected off objects and returned to the radar sensor). This allows the radar to detect different characteristics of the detection, including the distance of the target, velocity of the target, the angle (i.e., azimuth and elevation).

The SoC may generate and transmit different signals to different antenna elements on the 3D antenna array, which are then transmitted to the external environment surrounding the vehicle. The reflected signals are received by receiving antenna elements, which are co-located on the 3D antenna array. These received signals are processed by the SoC. By processing the returned signals separately based on different groups of antenna elements (i.e., based on the surface where the receiving elements are disposed), the SoC is able to differentiate different targets at different distances and directions relative to the vehicle.

For example, on a front-facing surface, the antenna elements may be directed forward in front of the vehicle (or to the rear of the vehicle with a rear-facing surface) with high-gain and narrow beam width (i.e., field of view). By collecting the returned signal sent and received by the antenna elements on the front-facing surface, the SoC is able to detect target objects (e.g., other vehicles, pedestrians, etc.) in front of the vehicle at long distances (i.e., due to the high gain), thus providing the long-range functions. As another example, a surface facing away from a side of the vehicle (i.e., the left or right side of the vehicle) may include elements that are directed to the side of the vehicle with low gain and a very wide field of view. By collecting the returned signal sent and received by these antenna elements disposed on the side surface, the SoC is able to detect objects at the side of the vehicle. Because the gain is low, the detection range is short. However, the system may detect targets nearby at different angles to the side of the vehicle because of the wide field of view. Thus, the radar simultaneously provides short-range functions and long-range functions. That is, the system may be able to detect multiple objects simultaneously and at different distances from the vehicles, such as when one object is in the respective field of sensing of the transmitters/receivers of one of the facets and when another object is in the respective field of sensing of the transmitters/receivers of a different one of the facets. Based on detecting object(s), the system may control a system of the vehicle (e.g., steering, acceleration, a warning/notification system, etc.). For example, the system may provide parking assistance, which warns of any obstacles surrounding the car.

The different signals sent to the antenna elements (i.e., by the SoC) may be designed with different waveforms (e.g., different amplitude and/or frequency) as well as different multiplexing techniques, allowing the radar to operate these modes simultaneously as well as independently. For example, the waveform for the short-range mode may have very wide signal bandwidth, thus providing high-resolution. The SoC may employ different multiplexing techniques, such as in time-domain, frequency-domain, and/or code-domain multiplexing techniques, to send different transmitting signals to different transmitting antenna elements. This allows the different operating modes (i.e., long-range modes, mid-range modes, long-range modes, etc.) to work simultaneously and independently and allow for the system to easily differentiate between the signals during simultaneous operation.

Additionally, the SoC may combine each of the detections of these different operating modes together in order to provide a full picture of the environment surrounding the vehicle, thus virtually increasing the field of view of the radar. This is an advantage compared to traditional radar techniques where the antennas are distributed only on a two-dimensional (2D) surface. In such 2D configurations, the field of view is limited by the 2D surface. The widened field of view of the radar sensors described herein provides a wider field of view (e.g., greater than 180 degrees), which is beneficial (e.g., for the blind spot detection).

The radar system may be produced by cascading multiple layers of metallic or metallic-coated layers, where the first layers consists of the radiating elements on different surfaces, and the following layers are used for routing signals from the radiating element in the first layer to the interface with the main PCB (e.g., a wave-guide coupling port) at the last layer on the back of the antenna module. Each layer may be created or produced using, for example, injection molding technology, with the plastic piece subsequently metallic coated. The integration of the antenna to the main PCB may be accomplished via the waveguide-coupling ports at the back of the antenna module. The design can be integrated directly with other components such as the PCB and/or the housing of a radar system.

Thus, the MMR system provides multiple simultaneous operating modes via a 3D antenna array using shared hardware, thus reducing the integration efforts and cost. The radiating elements of traditional radar antennas, even spatially distributed, are only on a 2D or planar surface. The radar field of view on such a 2D surface is limited by the radiating element, which leads to blind spot issues. The MMR with the 3D antenna array design remedies this by combining the field of view of different radiating elements on different surfaces with different orientations, thus virtually enlarging the field of view of the radar and reducing blind spots. The MMR system enables the system to sense a much wider region surrounding the vehicle more efficiently while offering a multi-operating mode, allowing the seamless integration into the autonomous driving system with minimum integration effort. The production of the system is simplified, as only a 3D antenna array and associated hardware is needed (i.e., without the need for different/separate hardware for corner radars, front radars, and side radars).

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
- a radar sensor disposed at a vehicle equipped with the vehicular radar sensing system, the radar sensor sensing exterior of the vehicle;
- wherein the radar sensor is operable to capture radar data;
- wherein the radar sensor comprises (i) a plurality of transmitters that transmit radio signals and (ii) a plurality of receivers that receive radio signals;
- an electronic control unit (ECU) comprising electronic circuitry and associated software;
- wherein radar data captured by the radar sensor is transferred to the ECU;
- wherein the electronic circuitry of the ECU comprises a data processor;
- wherein the ECU is operable to process radar data captured by the radar sensor and transferred to the ECU;
- wherein the radar sensor comprises a plurality of facets, and wherein each facet of the plurality of facets has (i) an inboard surface facing toward the vehicle and (ii) an outboard surface facing away from the vehicle;
- wherein the outboard surface of each facet of the plurality of facets is arranged at an obtuse angle relative to the outboard surface of an adjacent facet of the plurality of facets, and wherein each facet of the plurality of facets has (i) a respective transmitter of the plurality of transmitters disposed thereat and (ii) a respective receiver of the plurality of receivers disposed thereat;
- wherein the respective transmitter and the respective receiver of each facet of the plurality of facets operate to have a respective field of sensing, and wherein each respective field of sensing has a respective principal sensing axis, and wherein each respective principal sensing axis is perpendicular to the outboard surface of the respective facet;
- wherein the respective field of sensing of the respective transmitter and the respective receiver of a first facet of the plurality of facets is different from the respective field of sensing of the respective transmitter and the respective receiver of a second facet of the plurality of facets adjacent to the first facet;
- wherein the vehicular radar sensing system, via processing at the data processor of radar data captured by the radar sensor, simultaneously (i) determines presence of a first object within the respective field of sensing of the respective transmitter and the respective receiver of the first facet and (ii) determines presence of a second object within the respective field of sensing of the respective transmitter and the respective receiver of the second facet; and
- wherein the vehicular radar sensing system, responsive to determining presence of the first object and the second object, controls a system of the vehicle based on the determined presence of the first object and the second object.

2. The vehicular radar sensing system of claim 1, wherein the respective transmitter of each facet of the plurality of facets has a respective gain, and wherein the respective gain of the respective transmitter of the first facet is different from the respective gain of the respective transmitter of the second facet.

3. The vehicular radar sensing system of claim 1, wherein the plurality of facets comprises a third facet, and wherein the first facet and the third facet are disposed on opposing sides of the second facet and arranged at respective obtuse angles relative to the second facet.

4. The vehicular radar sensing system of claim 3, wherein the respective transmitter of the second facet has a gain that is greater than the respective transmitter of the first facet and the respective transmitter of the third facet.

5. The vehicular radar sensing system of claim 3, wherein the respective field of sensing of the respective transmitter and the respective receiver of the second facet is narrower than the respective field of sensing of the respective transmitter and the respective receiver of the first facet and the respective field of sensing of the respective transmitter and the respective receiver of the third facet.

6. The vehicular radar sensing system of claim 1, wherein each respective facet comprises a respective plurality of transmitters and a respective plurality of receivers disposed thereat.

7. The vehicular radar sensing system of claim 1, wherein the radar sensor comprises a printed circuit board (PCB), and wherein the radar sensor comprises a waveguide coupling port at the inboard surface of one of the facets, and wherein the waveguide coupling port couples radio signals between the plurality of facets and the PCB.

8. The vehicular radar sensing system of claim 1, wherein the radar sensor is disposed at a corner region of the vehicle.

9. The vehicular radar sensing system of claim 8, wherein the vehicular radar sensing system comprises four radar sensors, and wherein each radar sensor of the four radar sensors is disposed at a respective different corner region of the vehicle.

10. The vehicular radar sensing system of claim 8, wherein the corner region of the vehicle comprises a corner of a bumper of the vehicle.

11. The vehicular radar sensing system of claim 1, wherein each facet comprises a plurality of layers, and wherein the plurality of layers comprises an outer layer, an inner layer, and at least one intermediate layer.

12. The vehicular radar sensing system of claim 11, wherein the at least one intermediate layer routes radio signals from the inner layer to the outer layer, and wherein the at least one intermediate layer routes radio signals from the outer layer to the inner layer.

13. The vehicular radar sensing system of claim 1, wherein the radar sensor comprises a planar printed circuit board (PCB), and wherein the plurality of facets comprises three facets, and wherein only one facet of the three facets is mounted to the planar PCB.

14. The vehicular radar sensing system of claim 1, wherein a combined field of sensing of each of the plurality of facets is greater than 180 degrees.

15. A vehicular radar sensing system, the vehicular radar sensing system comprising:

a radar sensor disposed at a vehicle equipped with the vehicular radar sensing system, the radar sensor sensing exterior of the vehicle;

wherein the radar sensor is operable to capture radar data;

wherein the radar sensor comprises (i) a plurality of transmitters that transmit radio signals and (ii) a plurality of receivers that receive radio signals;

an electronic control unit (ECU) comprising electronic circuitry and associated software;

wherein radar data captured by the radar sensor is transferred to the ECU;

wherein the electronic circuitry of the ECU comprises a data processor;

wherein the ECU is operable to process radar data captured by the radar sensor and transferred to the ECU;

wherein the radar sensor comprises three facets, and wherein each facet of the three facets has (i) an inboard surface facing toward the vehicle and (ii) an outboard surface facing away from the vehicle;

wherein the outboard surface of each facet of the three facets is arranged at an obtuse angle relative to the outboard surface of an adjacent facet of the three facets, and wherein each facet of the three facets has (i) a respective transmitter of the plurality of transmitters disposed thereat and (ii) a respective receiver of the plurality of receivers disposed thereat;

wherein the respective transmitter and the respective receiver of each facet of the three facets operate to have a respective field of sensing, and wherein each respective field of sensing has a respective principal sensing axis, and wherein each respective principal sensing axis is perpendicular to the outboard surface of the respective facet;

wherein a first field of sensing of the respective transmitter and the respective receiver of a first facet of the three facets is (i) different from a second field of sensing of the respective transmitter and the respective receiver of a second facet of the three facets adjacent to the first facet and (ii) different from a third field of sensing of the respective transmitter and the respective receiver of a third facet of the three facets adjacent to the first facet;

wherein the second field of sensing of the respective transmitter and the respective receiver of the second facet is different from the third field of sensing of the respective transmitter and the respective receiver of the third facet adjacent to the second facet;

wherein the radar sensor comprises a printed circuit board (PCB), and wherein the radar sensor comprises a waveguide coupling port at the inboard surface of one of the facets, and wherein the waveguide coupling port couples radio signals between the three facets and the PCB;

wherein the vehicular radar sensing system, via processing at the data processor of radar data captured by the radar sensor, simultaneously (i) determines presence of a first object within the first field of sensing of the respective transmitter and the respective receiver of the first facet and (ii) determines presence of a second object within the second field of sensing of the respective transmitter and the respective receiver of the second facet; and wherein the vehicular radar sensing system, responsive to determining presence of the first object and the second object, controls a system of the vehicle based on the determined presence of the first object and the second object.

16. The vehicular radar sensing system of claim 15, wherein the respective transmitter of the first facet has a gain that is greater than (i) the respective transmitter of the second facet and (ii) the respective transmitter of the third facet.

17. The vehicular radar sensing system of claim 15, wherein the first field of sensing of the respective transmitter and the respective receiver of the first facet is narrower than (i) the second field of sensing of the respective transmitter and the respective receiver of the second facet and (ii) the third field of sensing of the respective transmitter and the respective receiver of the third facet.

18. The vehicular radar sensing system of claim 15, wherein the radar sensor is disposed at a corner region of the vehicle, and wherein the first facet comprises a forward-facing facet and the respective transmitter of the first facet has a first gain, and wherein the second facet comprises a corner-facing facet and the respective transmitter of the second facet has a second gain, and wherein the third facet comprises a sideward-facing facet and the respective transmitter of the third facet has a third gain.

19. The vehicular radar sensing system of claim 18, wherein the first gain is greater than the second gain and the second gain is greater than the third gain.

20. The vehicular radar sensing system of claim 15, wherein the first field of sensing of the respective transmitter and the respective receiver of the first facet is narrower than (i) the second field of sensing of the respective transmitter and the respective receiver of the second facet and (iii) the third field of sensing of the respective transmitter and the respective receiver of the third facet.

21. The vehicular radar sensing system of claim 20, wherein the third field of sensing is wider than the second field of sensing.

22. The vehicular radar sensing system of claim 15, wherein the PCB is mounted at the inboard surface of only the second facet.

23. A vehicular radar sensing system, the vehicular radar sensing system comprising:

a radar sensor disposed at a corner region of a vehicle equipped with the vehicular radar sensing system, the radar sensor sensing exterior of the vehicle;

wherein the radar sensor is operable to capture radar data;

wherein the radar sensor comprises (i) a plurality of transmitters that transmit radio signals and (ii) a plurality of receivers that receive radio signals;

an electronic control unit (ECU) comprising electronic circuitry and associated software;

wherein radar data captured by the radar sensor is transferred to the ECU;

wherein the electronic circuitry of the ECU comprises a data processor;

wherein the ECU is operable to process radar data captured by the radar sensor and transferred to the ECU;

wherein the radar sensor comprises a plurality of facets, and wherein each facet of the plurality of facets has (i) an inboard surface facing toward the vehicle and (ii) an outboard surface facing away from the vehicle;

wherein the outboard surface of each facet of the plurality of facets is arranged at an obtuse angle relative to the outboard surface of an adjacent facet of the plurality of facets, and wherein each facet of the plurality of facets has (i) a respective transmitter of the plurality of transmitters disposed thereat and (ii) a respective receiver of the plurality of receivers disposed thereat;

wherein the respective transmitter and the respective receiver of each facet of the plurality of facets operate to have a respective field of sensing, and wherein each respective field of sensing has a respective principal sensing axis, and wherein each respective principal sensing axis is perpendicular to the outboard surface of the respective facet, and wherein a combined field of sensing of each of the plurality of facets is greater than 180 degrees;

wherein the respective field of sensing of the respective transmitter and the respective receiver of a first facet of the plurality of facets is different from the respective field of sensing of the respective transmitter and the respective receiver of a second facet of the plurality of facets adjacent to the first facet;

wherein the vehicular radar sensing system, via processing at the data processor of radar data captured by the radar sensor, simultaneously (i) determines presence of a first object within the respective field of sensing of the respective transmitter and the respective receiver of the first facet and (ii) determines presence of a second object within the respective field of sensing of the respective transmitter and the respective receiver of the second facet; and wherein the vehicular radar sensing system, responsive to determining presence of the first object and the second object, controls a system of the vehicle based on the determined presence of the first object and the second object.

24. The vehicular radar sensing system of claim 23, wherein each facet comprises a plurality of layers, and wherein the plurality of layers comprises an outer layer, an inner layer, and at least one intermediate layer.

25. The vehicular radar sensing system of claim 24, wherein the at least one intermediate layer routes radio signals from the inner layer to the outer layer, and wherein the at least one intermediate layer routes radio signals from the outer layer to the inner layer.

26. The vehicular radar sensing system of claim 23, wherein the radar sensor comprises a planar printed circuit board (PCB), and wherein the plurality of facets comprises three facets, and wherein only one facet of the three facets is mounted to the planar PCB.

* * * * *